United States Patent [19]
Lee

[11] Patent Number: 6,108,150
[45] Date of Patent: Aug. 22, 2000

[54] FORMATION OF SERVO INFORMATION AND METHOD FOR SERVO CONTROL THEREFOR IN DISK DRIVE DATA STORAGE SYSTEM

[75] Inventor: Kang-Seok Lee, Suwon, Rep. of Korea

[73] Assignee: SamSung Electronics Co., Ltd., Suwon, Rep. of Korea

[21] Appl. No.: 08/872,765

[22] Filed: Jun. 5, 1997

[30] Foreign Application Priority Data

Jun. 5, 1996 [KR] Rep. of Korea ............. 96-20049

[51] Int. Cl.⁷ ........................................... G11B 5/09
[52] U.S. Cl. ........................................................ 360/48
[58] Field of Search ...................... 360/51, 77.08, 360/78.14, 48, 77.02, 77.05, 75

[56] References Cited

U.S. PATENT DOCUMENTS

| | | | |
|---|---|---|---|
| 5,073,834 | 12/1991 | Best et al. | 360/77.08 |
| 5,268,803 | 12/1993 | Sugita et al. | 360/77.08 |
| 5,311,379 | 5/1994 | Shinohara et al. | 360/77.02 |
| 5,339,207 | 8/1994 | Moon et al. | 360/77.05 |
| 5,459,623 | 10/1995 | Blagaila et al. | 360/77.08 |
| 5,523,903 | 6/1996 | Hetzler et al. | 360/77.08 |
| 5,526,202 | 6/1996 | Blagaila et al. | 360/77.08 |
| 5,561,566 | 10/1996 | Kigami et al. | 360/48 |
| 5,579,186 | 11/1996 | Yamamoto et al. | 360/75 |
| 5,581,418 | 12/1996 | Hasebe | 360/51 |
| 5,589,998 | 12/1996 | Yu | 360/78.14 |
| 5,596,460 | 1/1997 | Greenberg et al. | 360/78.14 |

*Primary Examiner*—W. Chris Kim
*Attorney, Agent, or Firm*—Robert E. Bushnell, Esq.

[57] ABSTRACT

A technique for the formation of servo information and its servo control capable of enlarging a total available area for data regions by reducing a servo region for servo information in a hard disk drive is used in a disk drive recording apparatus having at least one disk having tracks provided thereon with a plurality of servo sectors for recording the servo information and a plurality of data sectors, the servo sector and the data sectors each being arranged in sequence in a track of the disk in an alternate manner, and a transducer for reading out data from the data sectors as well as writing data onto the data sectors. The technique includes dividing a series of servo information into a plurality of subsections of servo information, the servo information being usable for positioning the transducer on a selected data sector in a target track, and respectively recording the divided subsections of servo information onto the same number of servo sectors as the number of the plurality of subsections.

12 Claims, 5 Drawing Sheets

FORMATION OF SERVO INFORMATION AND METHOD FOR SERVO CONTROL THEREFOR IN DISK DRIVE DATA STORAGE SYSTEM

CLAIM OF PRIORITY

This application makes reference to, incorporates the same herein, and claims all benefits accruing under 35 U.S.C. § 119 from an application for FORMATION OF SERVO INFORMATION AND METHOD FOR SERVO CONTROL THEREFOR IN DISK DRIVE DATA STORAGE SYSTEM earlier filed in the Korean Industrial Property Office on the 5th day of June 1996 and there duly assigned Serial No. 20049/1996, a copy of which application is annexed hereto.

BACKGROUND OF THE INVENTION

1. Field of the Invention

The present invention relates to a servo control for a disk drive data storage system. More particularly, the present invention relates to the formation of servo information in a hard disk drive and a method for its servo control.

2. Description of the Related Art

A hard disk drive has been extensively used as one of the most preferred and efficient auxiliary memory means for computer systems. The entire operation of a hard disk drive is controlled by a microprocessor which is connected to a programmable read only memory. The read only memory stores a set of necessary basic operating software and servo control algorithms.

A static random access memory is also provided. A read/write head is horizontally moved in and out on the surface of a recording medium such as a disk upon reading and writing data from and to the disk. A voice coil motor is coupled to the head, serving as an actuator for driving the head in a horizontal direction on the disk during the read/write operation and a voice coil motor driver is coupled to the voice coil motor to control its operation. A spindle motor is coupled to the disk for driving a high speed rotation of the disk on its central axis.

A digital to analog converter receives a series of digital control signals from microprocessor and converts the digital control signals to analog signals for input to the voice coil motor driver. A motor driver is coupled to the spindle motor to control its rotation under the control of the microprocessor.

An amplifier is connected to the head to effect an amplification of a read data signal retrieved by the head as well as a write data signal to be recorded on the disk so as to provide a proper amplitude level of signal.

An interface controller serves as an interface to communicate various data with any peripheral circuits inclusive of a host computer as well as the microprocessor.

A read/write channel circuit is coupled to the amplifier and the interface controller and further to the microprocessor through a gate array and an analog to digital converter so as to receive the write data from the interface controller under the control of the microprocessor, and encodes the received write data according to the predetermined coding logic prior to delivery to the amplifier.

Furthermore, the read/write channel circuit effects a digital conversion of the analog read signal from the amplifier to provide encoded read data. The analog to digital converter is connected to the read/write channel circuit to receive an analog servo reading signal and to convert the received signal into a digital signal for input to the microprocessor.

The gate array circuit is also connected to the read/write channel circuit to receive the encoded read data signal to generate the various servo information such as a gray code in a servo region of the disk from the received encoded read data signal.

In the aforementioned hard disk drive, a precise servo control is needed during the read/write operation to relocate the head to a desired target track and to have the head accurately follow its center course along the target track. Servo information necessary for the servo control is usually recorded on the disk by a servo writer during a manufacturing stage of a hard disk drive, wherein two kinds of recording methods are generally utilized by manufactures, that is, a so-called "dedicated" servo method for recording the servo information using a single entire surface of a plurality of hard disks and an "embedded" servo method for recording the servo information as well as the write data on the same disk surface. The dedicated servo method is mainly utilized for a hard disk drive having at least four disks in a stack while the embedded servo method is utilized for a hard disk drive consisting of a smaller number of disks than the dedicated servo method.

In the embedded servo method, the servo sectors for servo information and the data sectors are alternately arranged. The respective servo sector consists of an automatic gain control region, a servo address mark region, and index region, a gray code region, a servo burst region, and a PAD region. The automatic gain control region also functions as a read/write recovery region and serves to constantly maintain the time necessary for changing the head from a data write mode to a servo information read mode as well as a magnitude of position signal read out of the head throughout the entire disk area. The servo address mark region is for recording a reference pattern for generation of the various servo timings and the index region is for providing a unit revolution information of the disk. The gray code region includes the respective numbers of a servo sector, a head and a cylinder, and the servo burst and PAD regions are used to control on-track positioning of the head.

As the aforementioned servo information often leads to a reduction of the data storage capacity for a user of the hard disk, it is accordingly appreciated that the reduction of such servo information enables one to increase the data storage capacity permitted to the user. According to the current state of the art, it is noted that the servo information area requires at least 10 to 15% of the entire disk area. As a result, the smaller the area of the servo region used, the larger the data storage area obtained for a user in a hard disk drive, which may result in the reduction of the production costs The Yu patent, U.S. Pat. No. 5,589,998, entitled Cylinder Address Storage In Multiple Servo Sectors OF A Track, discloses a cylinder address storage arrangement for multiple servo sectors of a recording track in which partial cylinder addresses are stored on each servo sector of each track to reduce the servo data.

The Blagaila et al. patent, U.S. Pat. No. 5,526,202, entitled Disk Drive Embedded Servo System Having A Servo Field With An Asymmetrical Position Subfield, discloses a disk drive arrangement in which the servo fields are of different sizes so as to reduce the servo overhead.

The Shinohara et al. patent, U.S. Pat. No. 5,311,379, entitled Method And System For Positioning Head On Target Cylinder Of Disk, discloses an arrangement in which the servo signal used to drive the head position signal includes at least first and second servo signal components on even cylinders of the magnetic disk and third and fourth servo signal components on odd cylinders of the magnetic disk.

The following additional patents each disclose features in common with the present invention but are not as pertinent as the patents noted above: U.S. Pat. No. 5,268,803 to Sugita et al, entitled Disc Memory Apparatus Utilizing Detection Of High Accuracy Address Data In Short Servo Sectors For High SpeedAccessing, U.S. Pat. No. 5,073,834 to Best et al., entitled Disk File Or Tape Drive With High Servo Sample Rate Embedding Additional Servo Sectors Within Individual Data Sectors, U.S. Pat. No. 5,339,207 to Moon et al., entitled Servo System For Providing with the same data storage capacity or an increase of the data storage capacity with a like disk size or the same cost.

Thus, so far, various improvements to reduce a total size of the servo information have been proposed in the state of the art by achieving more effective formation of the servo information sector in a hard disk drive. Generally, the reducible portions of the servo information may be the AGC region, the gray code region and the servo burst region. Unfortunately however, the AGC region could not be further reduced below a given physical size because it mainly depends upon performance of the head and the read/write channel. Furthermore, the servo burst region also could not be further reduced below a given size because it is to be limited by the filter characteristic of a servo signal portion of the read channel and its reproducing circuit portion. In addition, with the headerless servo writing pattern, a servo sector number and a head number as well as a track address, namely, a cylinder number are recorded together in the respective gray code region, so that it often leads to enlargement of the gray code region, thereby resulting in failure of extension of a total size of data regions in a hard disk drive.

Moreover, enlargement of the gray code region not only causes the decrease of the data region, but also makes a disk more susceptible to its defects, which disk is often forced to be completely replaced by a defect-free new disk due to the defects found or to require a kind of special defect management program for compensation for any defects. Therefore, the above drawbacks mostly results in an increase of the production cost for a hard disk drive or the deterioration of the reliability and stability in operation of a disk. Increased Recording Density And Improved Operation Of The AGC Circuitry, U.S. Pat. No. 5,579,186 to Yamamoto etal., entitled Magnetic Disk Unit And Method For Controlling The Same, U.S. Pat. No. 5,561,566 to Kigami et al., entitled Information Recording Disk And Drive System Using No Sector ID To Increase Data Storage Capacity, U.S. Pat. No. 5,523,903 to Hetzler et al., entitled Sector Architecture For Fixed Block Disk Drive, U.S. Pat. No. 5,581,418 to Hasebe, entitled Magnetic Disk Drive Unit Capable Of Determining Data Region Position Of Data Region That Does Not Include Position Identification Data, and U.S. Pat. No. 5,596,460 to Greenberg et al, entitled System And Method for Encoding A Servo Address.

SUMMARY OF THE INVENTION

It is therefore an object of the present invention to provide an improved method of formation for servo information capable of enlarging a total available size of data regions by means of reducing a servo region for servo information in a disk drive.

It is another object of the present invention to provide a servo control method incorporating the improved formation of the servo information for enlarging a total available size of data regions in a disk drive.

These and other objects can be achieved according to the principles of the present invention incorporating a method for formation of servo information applicable in a disk drive recording apparatus having at least one disk having tracks provided thereon with a plurality of servo sectors for recording the servo information and a plurality of data sectors, the servo sector and the data sectors each being arranged in sequence in a track of the disk in an alternate manner, and a transducer for reading out data from the data sectors as well as writing data onto the data sectors, the method including the steps of dividing a series of servo information into a plurality of subsections of servo information, the servo information being usable for positioning the transducer on a selected data sector in a target track, and respectively recording the divided subsections of servo information onto the same number of servo sectors as the number of the plurality of subsections.

According to another aspect of the present invention, a method is provided for servo control in a disk drive recording apparatus having at least one disk in which track numbers are recorded only in the odd/even number of servo sectors, including the steps of comparing a count value of seeked servo sectors with a total servo sector number available in one track with respect to each index signal so as to maintain a precise synchronization for servo control, and reading the respective track numbers recorded in the odd/even number of servo sectors therefrom to perform a track seeking operation.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1:
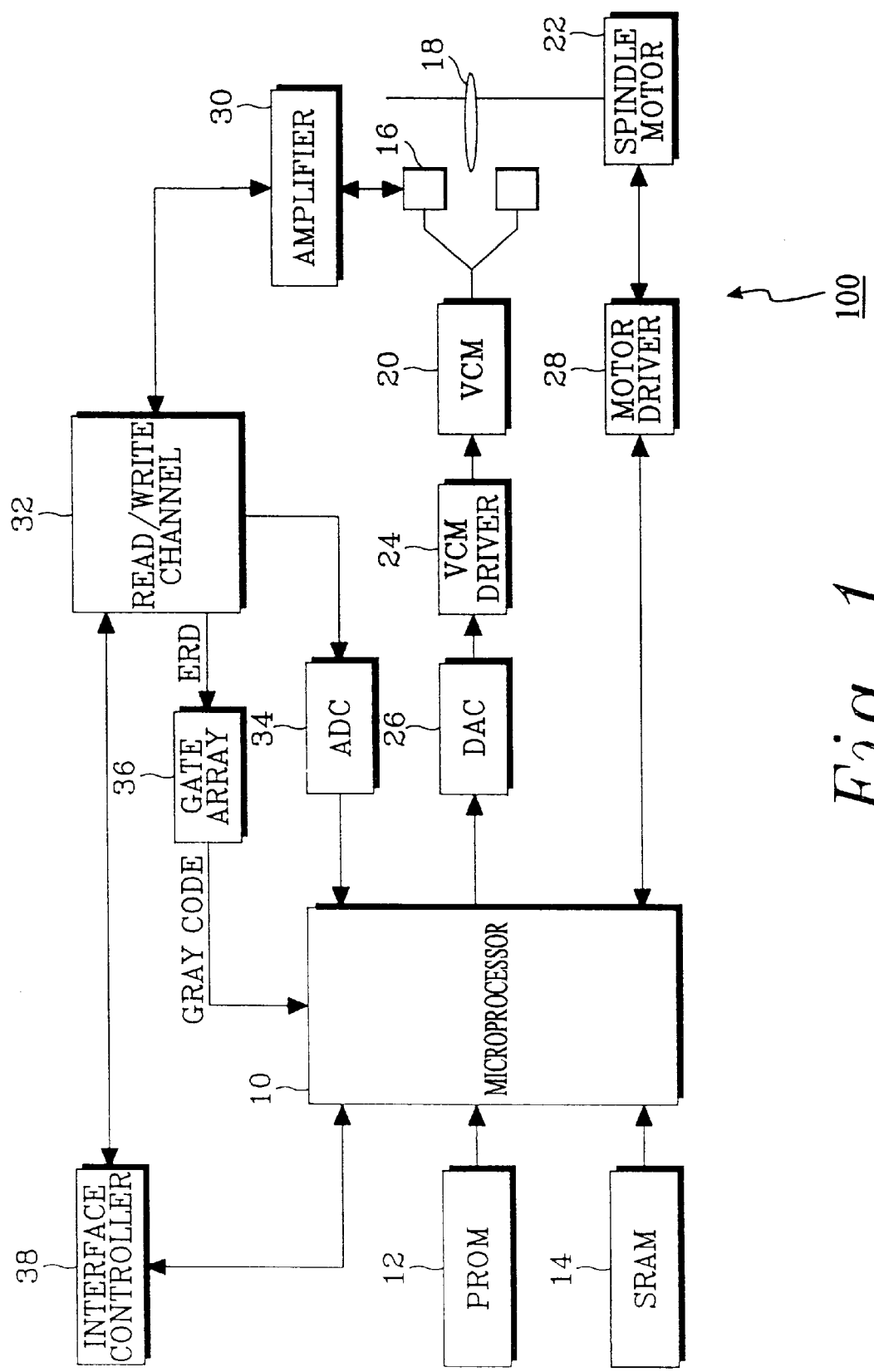
FIG. 1 block diagram illustrating a summarized construction of a hard disk drive incorporating the present invention.

A hard disk drive has been extensively used as one of the most preferred and efficient auxiliary memory means for computer systems, of which summarized construction is illustrated in a block diagram of FIG. 1, in which a reference numeral 100 generally represents such a hard disk drive incorporating the present invention. A brief description of this hard disk drive is provided hereinbelow to be exemplary of the environment of the invention, which however is not intended to be limiting as to the particular arrangement of the above illustrated hard disk drive 100.

Referring to FIG. 1, the entire operation of the hard disk drive 100 controlled by a microprocessor 10, which is connected to a programmable read only memory (PROM) 12 including a set of necessary basic operating software and servo control algorithm, and a static random access memory (SRAM) 14. A read/write head 16 is horizontally moved in and out on the surface of a recording medium, that is, a disk 18 upon reading and writing data from and to the disk. A voice coil motor (VCM) 20 is coupled to the head 16, serving as an actuator for driving the head in a horizontal direction on the disk 18 during the read/write operation, and a voice coil motor (VCM) driver 24 is coupled to the voice coil motor 20 to control its operation. A spindle motor 22 is coupled to the disk 18 for driving a high speed rotation of the disk on its central axis. A digital to analog converter (DAC) 26 receives a series of digital control signals from the microprocessor 10 and converts the digital control signals to analog signals for input to the voice coil motor driver 24. A motor driver 28 is coupled to the spindle motor 22 to control its rotation under control of the microprocessor 10. An amplifier 30 is connected to the head 16 to effect an amplification of a read data signal retrieved by the head as well as a write data signal to be recorded on the disk so as to provide a proper amplitude level of signal. An interface controller 38 serves as an interface to communicate various data with any peripheral circuits inclusive of a host computer (not shown) as well as the microprocessor 10. A read/write channel circuit 32 is coupled to the amplifier 30 and the interface controller 38 and further to the microprocessor 10 through a gate array 36 and an analog to digital converter (ADC) 34, so as to receive the write data from the interface controller 38 under the control of the microprocessor, and encodes the received write data according to a predetermined coding logic prior to a delivery to the amplifier 30. Further, the read/write channel circuit 32 effects a digital conversion of the analog read signal from the amplifier to provide encoded read data (hereinafter, referred to as ERD). The analog to digital converter (ADC) 34 is connected to the read/write channel circuit to receive an analog servo reading signal and to convert the received signal into a digital signal for input to the microprocessor 10. The gate array circuit 36 is also connected to the read/write channel circuit 32 to receive therefrom the ERD signal and to generate the various servo information such as a gray code in a servo region of the disk 18 from the received ERD signal.

In the aforementioned hard disk drive, a precise servo control is essentially needed during the read/write operation to relocate the head 16 to a desired target track and to have the head accurately follow its center course along the target track. Servo information necessary for the servo control is usually recorded on the disk by a servo writer during a manufacturing stage of the hard disk drive, wherein two kinds of servo recording methods are generally utilized by manufacturers, that is, a so-called "dedicated" servo method to record the servo information using a single entire surface of a plurality of hard disks and then an "embedded" servo method to record the servo information as well as the write data on the same disk surface. The dedicated servo method is mainly utilized for a hard disk drive having at least four disks in stack, while the embedded servo method is utilized for a hard disk drive consisting of a smaller number of disks than the dedicated servo method. Now, the formation of the servo information recorded with the embedded servo method is described with reference to the drawing of FIG. 2, hereinbelow.

Figure 2:
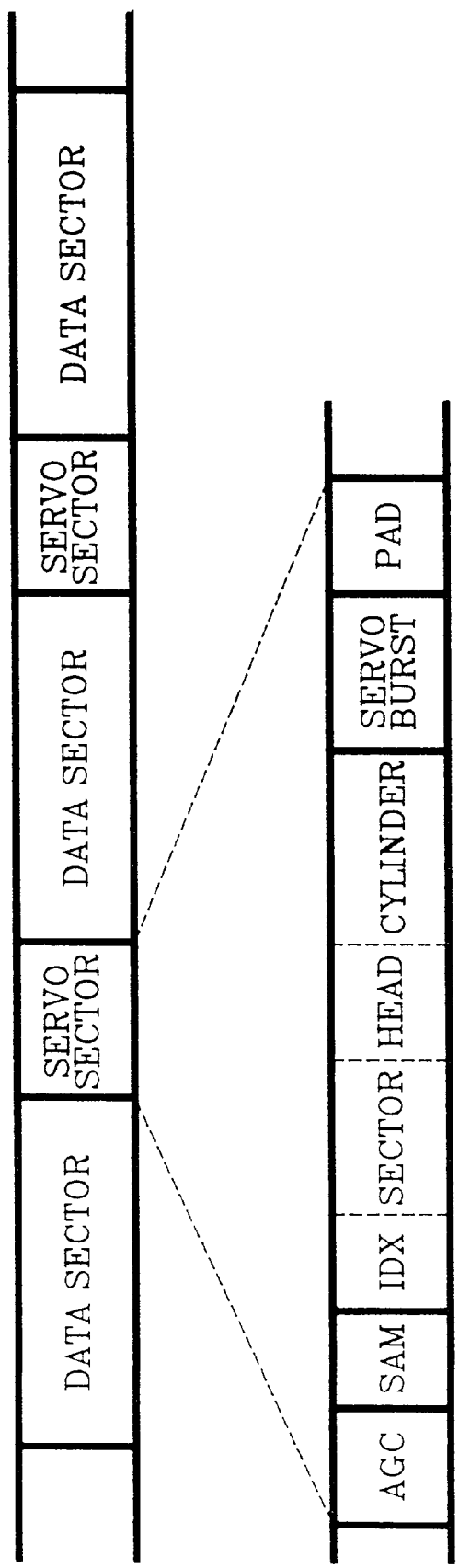
FIG. 2 is a schematic diagram illustrating an earlier sector format of a track in which servo sectors for servo information and data sectors are alternately arranged in the embedded servo method.

FIG. 2 is a schematic diagram illustrating the sector format of a track in which the servo sectors for servo information and the data sectors are alternately arranged in the embedded servo method, in which the respective servo sector consists of an automatic gain control (AGC) region, a servo address mark (SAM) region, an index (IDX) region, a gray code region, a servo burst region and a PAD region. The AGC region also functions as a read/write recovery region and serves to constantly maintain the time necessary for changing the head 16 from a data write mode to a servo information read mode as well as a magnitude of position signal read out of the head 16, throughout the entire disk area. The SAM region is to record a reference pattern for generation of the various servo timings and the index region is to provide a unit revolution information of the disk. The gray code region includes the respective numbers of a servo sector, a head and a cylinder, and the servo burst and PAD regions are used to control on-track position of the head.

Hereinafter, the preferred embodiment of the present invention will be described in further detail with reference to the accompanying drawings, in which the various particulars including flowcharts for control, numbers of servo sectors for unit servo information and bits or bytes, a data format, etc. have been illustrated for better understanding of the present invention. However, it should be noted that the present invention is not limited to those specifications set forth by way of an example in the following embodiment. Further, a detailed description of known functions and constructions unnecessarily obscuring a better understanding of the subject matter of the present invention has been omitted in the present application.

Figure 3:
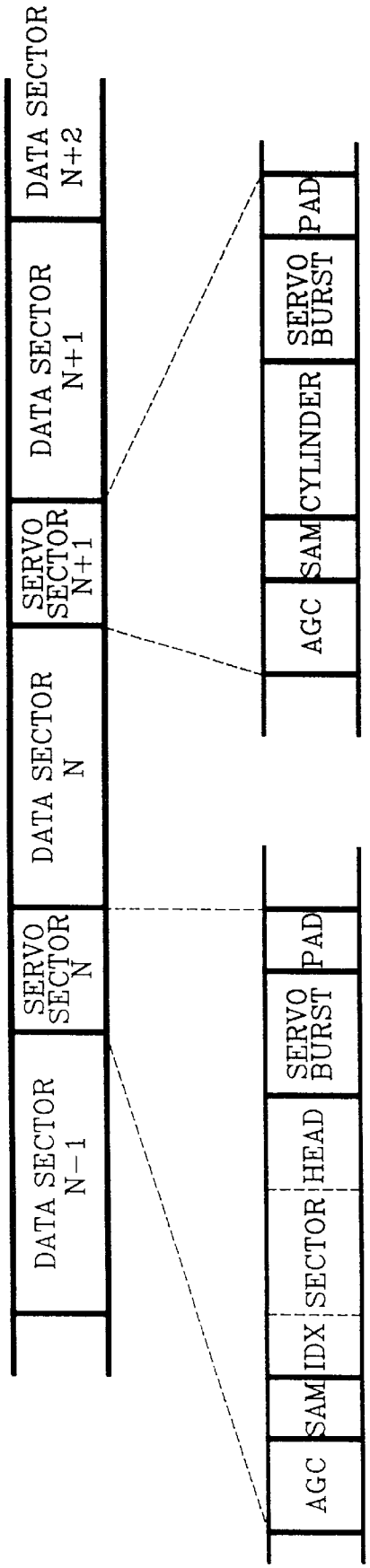
FIG. 3 is a schematic diagram illustrating the sector format for formation of the servo information according to a preferred embodiment of the present invention.

FIG. 3 is a schematic diagram illustrating the sector format for formation of the servo information according to a preferred embodiment of the present invention. For a better understanding of the invention, it is assumed that the address information is comprised of a cylinder number, a servo sector number and a head number, and that the servo sector number and the head number are recorded as address information in a gray code region for an even servo sector (for instance, servo sector N), while the cylinder number is recorded as address information in a gray code region for an odd servo sector (for instance, servo sector N+1). Further, in the preferred embodiment of the present invention, a single set of address information is divided into two portions, each of which is recorded in a respective gray code region of either one of even and odd servo sectors, in which formation a number of servo sectors in a track should be an N multiple of an integer 2. Hence, assuming that the address information is to be divided into an N number of portions, then the number of servo sectors per track would be a multiple of the number N. Here, although each bit number indicative of those numbers of cylinder, servo sector and head may be changed in accordance with a hard disk system used with a computer, it is assumed for convenience sake that the numbers of cylinder, servo sector and head are in 13-bit, 7-bit and 3-bit words, respectively, and further, an index bit of the index region serving as a reference signal for every rotation of disk is in a 1-bit word. According to the above bit construction, the even servo sector is comprised of an AGC region, a SAM region, an index region, a gray code region for a sector number and a head number, a servo burst region and a PAD region, while the odd servo sector is comprised of an AGC region, a SAM region, a gray code region for a cylinder number, a servo burst region and a PAD region, as illustrated in a schematic format diagram of FIG. 3.

Hereinafter, the servo control sequence incorporating the above mentioned sector format for servo information is described with reference to FIGS. 4 and 5.

Figure 4:
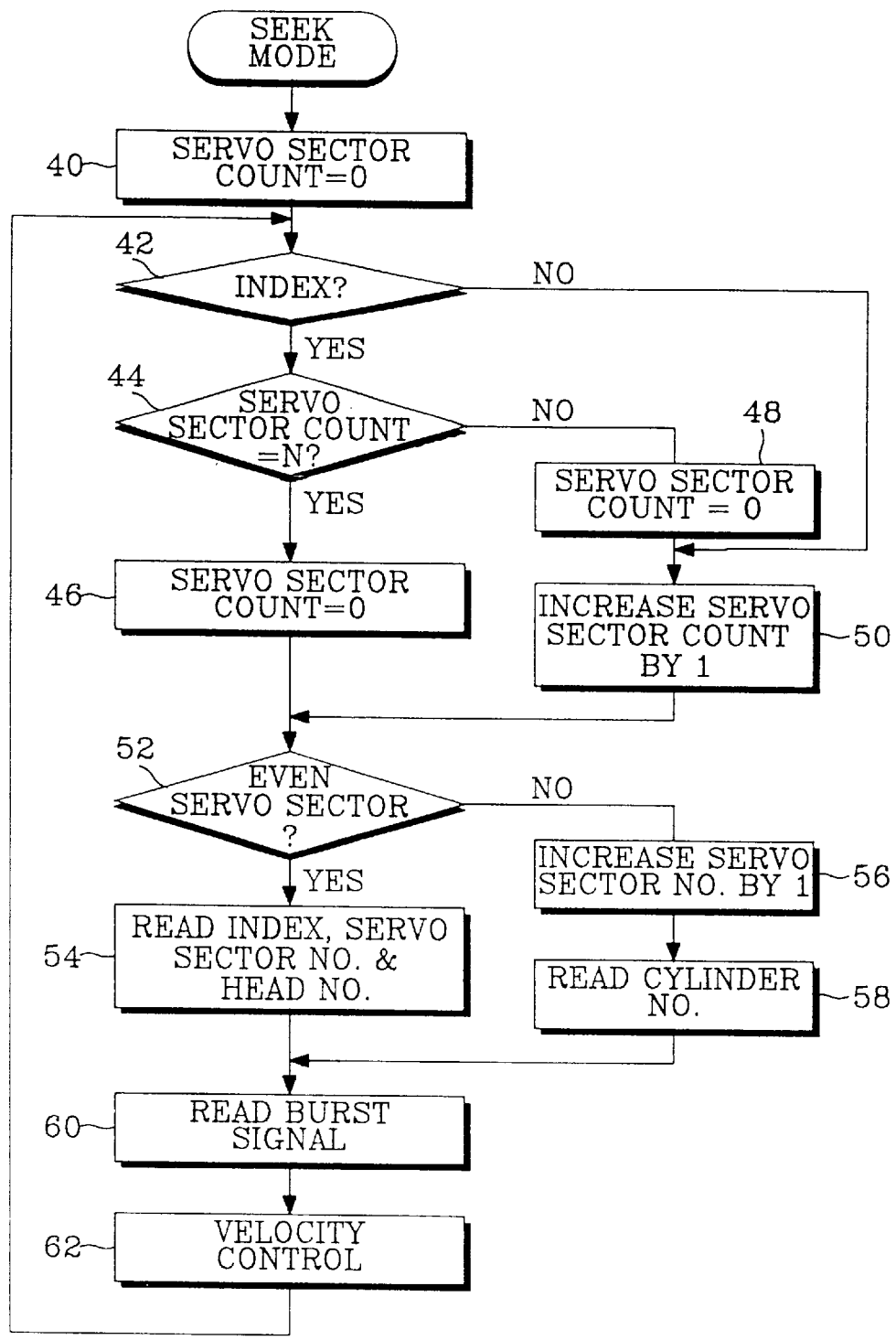
FIG. 4 is a flowchart illustrating the servo control sequence in a track seek in ode according to the preferred embodiment of the present invention.

Referring now to FIG. 4, the servo control sequence in a track seek mode according to the preferred embodiment of the present invention is illustrated. Once the microprocessor 10 of FIG. 1 receives a data read/write instruction from a host computer, it checks whether any track seek is necessary in response to the received instruction. As a result of the checking, if the track seeking is needed, then it controls the system to execute the track seek mode of FIG. 4. At first, in step 40, a servo sector count is initialized to "0" and control proceeds to step 42. At step 42, the microprocessor checks whether any index pulse has been generated from the servo region of the disk, and if so, then control proceeds to step 44, but if not, then control proceeds to step 50. Then, the microprocessor determines in step 44 if the current servo sector count is equal to a number N of total servo sectors provided for the same track, and if so, then control proceeds to step 46 to set the servo sector count again to "0" and thereafter proceeds to step 52. In step 44, however, if the current servo sector count is not equal to the number N of servo sectors, then control proceeds to step 48 to set the servo sector count again to "0" and further proceeds to step 50 to increase the servo sector count by "1", after which control proceeds to the step 52 to check if the servo sector count value is an even number. At step 52, if the count value is determined to be for an even numbered servo sector, then the control proceeds to step 54, but if it is for an odd numbered servo sector, then the control proceeds to step 56. At step 56, the servo sector number is increased by "1", and then control proceeds to step 58 to read the cylinder number recorded in the gray code region of the odd servo sector and thereafter control proceeds to step 60. At step 54, the index data, the servo sector number and the head number included in the gray code region of the even servo sector are read into the microprocessor 10 from the disk and then the control proceeds to step 60 to read the burst signal. At step 62, the microprocessor carries out a velocity control for the head, such as its acceleration or deceleration, according to a predetermined velocity data table stored in the PROM 12 and then the control returns to step 42. According to the preferred embodiment of the present invention, the voice coil motor 20 is modeled to embody a state estimator, by which the velocity and position of the head could be calculated using a positional error signal generated from a servo demodulator. That is to say, regarding the even servo sector where no cylinder number is recorded, the velocity and position of the head movement are determined according to estimated values provided by means of the state estimator, whereas in the odd servo sector an error compensation method is utilized. According to the present invention, a correct modeling for the state estimator enables the head to be provided with estimated values for its movement having no significant difference from the actual values.

Figure 5:
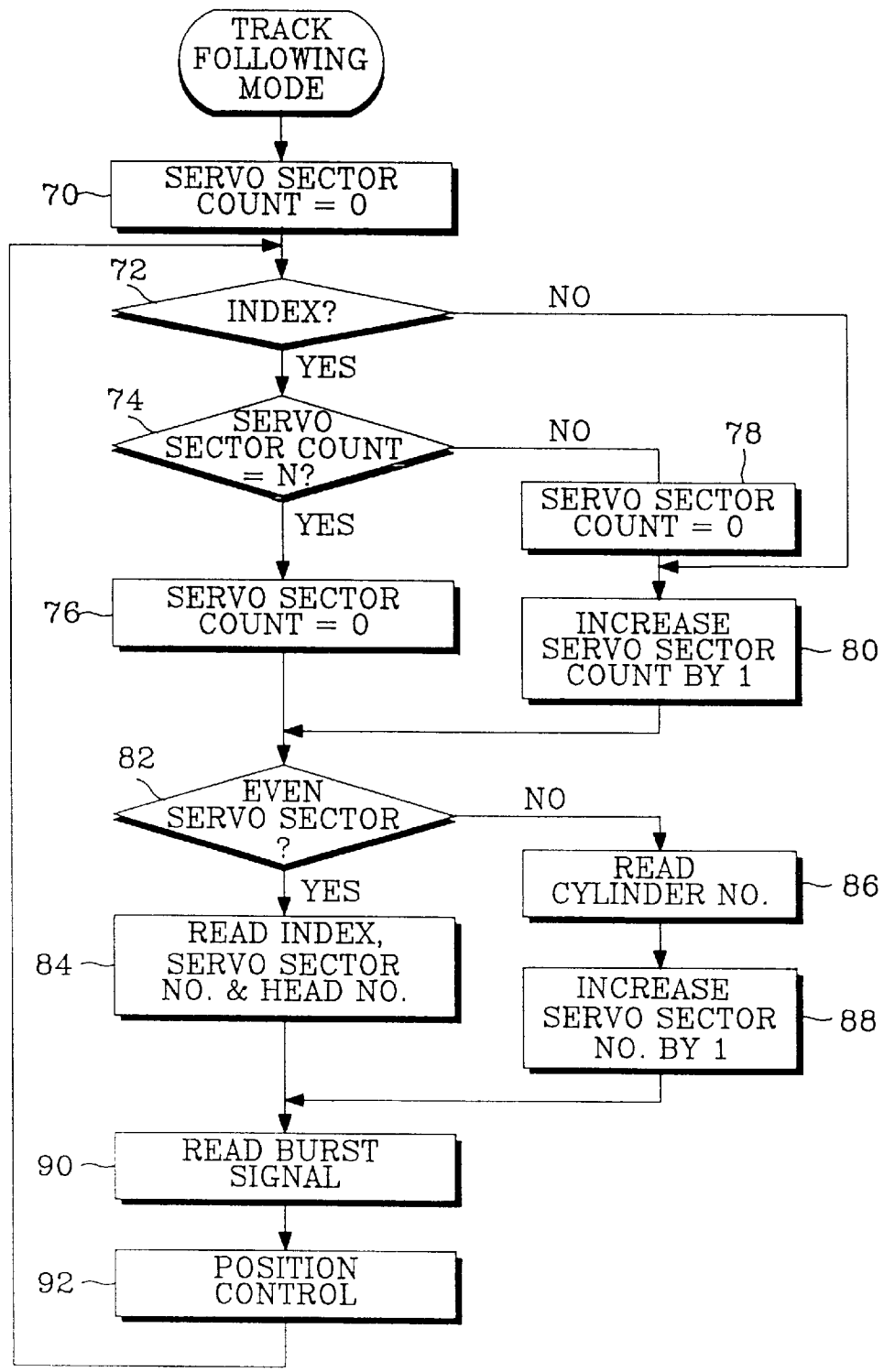
FIG. 5 is a flowchart illustrating the servo control sequence in a track following mode according to the preferred embodiment of the present invention.

Referring now to FIG. 5, the servo control sequence in a track following mode according to the preferred embodiment of the present invention is shown, in which mode the head 16 is controlled to follow on a target track its center course along the track, following positioning of the head on the desired target track according to the above-described track seek control. According to the track following mode, at the beginning, in step 70, a servo sector count is initialized to zero and control proceeds to step 72. At step 72 the microprocessor checks whether index pulse has been generated from the servo region of the disk, and if so, then control proceeds to step 74, but if not, then control proceeds to step 80. Then, the microprocessor determines in step 74 if the current servo sector count is equal to the number N of total servo sectors provided for the same track, and if so, then control proceeds to step 76 to reset the servo sector count again to zero and thereafter proceeds to step 82. In step 74, however, if the current servo sector count is not equal to the number N of servo sectors, then control proceeds to step 78 to reset the servo sector count again to zero and further proceeds to step 80 to increase the servo sector count by "1", after which control proceeds to step 82 to check if the servo sector count value is an even number. At step 82, if the count value is for an even numbered servo sector, the control proceeds to step 84, but if it is for an odd numbered servo sector, then the control proceeds to step 86. At step 86, the microprocessor reads the track number recorded in the gray code region of the odd servo sector, that is, the cylinder number, and then, at step 88, the servo sector number is increased by "1". Thereafter, control proceeds to step 90. At step 84, the index data, the servo sector number and the head number included in the gray code region of the even servo sector are read into the microprocessor 10 from the disk and then the control proceeds to step 90 to read the burst signal, so that at step 92 the microprocessor carries out a series of positional controls for the head 16 such as the "on-track" position control. Thereafter, the routine goes back to the step 72 to repeatedly execute steps 72 to 92.

Summarizing, according to the aforementioned track seeking and track following modes of operations, a servo sector count value is always compared with the number of servo sectors per track with respect to every index region in order to keep synchronization of the servo data, wherein in the even numbered servo sectors the servo information including the index data, the servo sector number and the head number is utilized to define and control the various physical variables for head movement, while in the odd numbered servo sectors the servo information including the cylinder number is utilized to define and control the variables for head movement.

As is apparent from the foregoing description, the present invention has an advantage that a total available area for the data region in a hard disk drive could be effectively increased owing to use of a smaller size of servo sector for the servo information than the earlier hard disk drive. According to the principle of the present invention, the address information to be recorded in a series of bit format within a respective gray code region is split into at least two sections, for instance, an even sector and an odd sector, which split address information enables one to reduce the size of the gray code region of each servo sector so as to enlarge the size of the data region. As a result, the more stable servo control and the higher reliability of the hard disk drive will be obtained with use of the above formation of the servo sectors and its servo control of the present invention.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

What is claimed is:

1. A disk drive system, comprising:
   a data recording disk having radially spaced tracks, each track being divided by a plurality of alternately arranged first servo sectors, first data sectors, second servo sectors and second data sectors; and servo address information stored in said first and second servo sectors, said servo address information comprising a sector number, a head number and a cylinder number, said sector number and said head number being stored in the first servo sectors and said cylinder number being stored in the second servo sectors.

2. The disk drive system as set forth in claim 1, wherein said servo address information further comprises an index number, said index number being stored in said first servo sectors.

3. The disk drive system as set forth in claim 1, wherein said first servo sectors precede said first data sectors and are even servo sectors and said second servo sectors succeed said first data sectors and are odd servo sectors.

4. A method of storing servo address information on a disk having radially spaced tracks, each track being divided by a plurality of alternately arranged servo sectors and data sectors, said method comprising the steps of:

dividing said servo address information comprising a sector number, a head number and a cylinder number into two servo address sub-sections, a first sub-section comprising said sector number and said head number, and a second sub-section comprising said cylinder number;

storing said first sub-section in servo sectors preceding said data sectors; and storing said second subsection in servo sectors succeeding said data sectors.

5. The method as set forth in claim 4, further comprising storing an index number in said servo sectors preceding said data sectors as part of said servo address information in said first sub-section.

6. The method as set forth in claim 4, further comprising storing said sub-sections in gray coded regions of respective ones of said servo sectors, said servo sectors forming a predetermined total number of servo sectors.

7. The method as set forth in claim 6, wherein said predetermined total number of servo sectors are made a multiple of the number of said divided sub-sections of servo information.

8. A method of storing servo address information on a disk having radially spaced tracks, each track being divided by a plurality of alternately arranged servo sectors and data sectors, said method comprising the steps of:

dividing said servo address information comprising a sector number, a head number and a cylinder number into two servo address sub-sections, a first sub-section comprising said sector number and said cylinder number, and a second sub-section comprising said head number;

storing said first sub-section in servo sectors preceding said data sectors; and storing said second sub-section in servo sectors succeeding said data sectors.

9. The method as set forth in claim 8, further comprising storing an index number in said servo sectors preceding said data sectors as part of said servo address information in said first sub-section.

10. The method as set forth in claim 8, wherein each of said sub-sections are stored in gray coded regions of respective ones of said servo sectors, said servo sectors forming a predetermined total number of servo sectors.

11. The method as set forth in claim 10, wherein said predetermined total number of servo sectors are made a multiple of the number of said divided sub-sections of servo information.

12. The method as set forth in claim 8, wherein said servo sectors preceding said data sectors are even servo sectors and said servo sectors succeeding said data sectors are odd servo sectors.

* * * * *